(12) United States Patent
Nematollahi et al.

(10) Patent No.: US 8,058,189 B1
(45) Date of Patent: Nov. 15, 2011

(54) METHOD AND APPARATUS FOR RESISTING BALLISTIC IMPACT

(75) Inventors: Khosrow Nematollahi, Carmel, IN (US); Robert L. Hager, Loogootee, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 759 days.

(21) Appl. No.: 12/028,796

(22) Filed: Feb. 9, 2008
(Under 37 CFR 1.47)

Related U.S. Application Data

(63) Continuation-in-part of application No. 11/653,480, filed on Jan. 11, 2007.

(60) Provisional application No. 60/762,561, filed on Jan. 13, 2006.

(51) Int. Cl.
*B32B 27/04* (2006.01)
*B05D 5/12* (2006.01)

(52) U.S. Cl. ...... 442/134; 89/36.01; 89/36.02; 206/317; 427/561; 427/564; 427/96.9; 427/97.1; 428/105; 2/2.5; 442/135

(58) Field of Classification Search ...... 2/2.5; 89/36.01, 89/36.02; 206/317; 428/105, 911; 442/134, 442/135; 427/561, 564, 96.9, 97.1
See application file for complete search history.

(56) References Cited

U.S. PATENT DOCUMENTS

| | | |
|---|---|---|
| 4,027,601 A | 6/1977 | Hickerson |
| 4,432,285 A | 2/1984 | Boyars et al. |
| 4,440,296 A | 4/1984 | Howe et al. |
| 4,586,602 A | 5/1986 | Levey |
| 4,813,334 A | 3/1989 | Bloks et al. |
| 5,221,807 A | 6/1993 | Vives |
| 5,705,764 A | 1/1998 | Schade et al. |
| 5,738,925 A | 4/1998 | Chaput |
| 5,824,940 A | 10/1998 | Chediak et al. |
| 6,341,708 B1 | 1/2002 | Palley et al. |
| 6,347,700 B1 | 2/2002 | Redfield et al. |
| 6,497,966 B2 | 12/2002 | Cohen |
| 7,204,183 B2 | 4/2007 | Cirillo |
| 2007/0034074 A1 | 2/2007 | Ravid et al. |
| 2007/0089597 A1 | 4/2007 | Ma |
| 2008/0171166 A1 | 7/2008 | Nematollahi |

*Primary Examiner* — Arti Singh-Pandey
(74) *Attorney, Agent, or Firm* — Christopher A. Monsey (57) ABSTRACT

A method and apparatus for resisting ballistic impact including an outer energy absorbing assembly having a plurality of interconnected fibers, and a barrier positioned behind the outer energy absorbing assembly. A movement restraint is positioned behind the barrier and a dampener is positioned intermediate the barrier and the restraint.

29 Claims, 7 Drawing Sheets

METHOD AND APPARATUS FOR RESISTING BALLISTIC IMPACT

CROSS-REFERENCE TO RELATED APPLICATIONS

This application is a continuation-in-part of U.S. patent application Ser. No. 11/653,480, filed Jan. 11, 2007, which claims priority to U.S. Provisional Patent Application Ser. No. 60/762,561, filed Jan. 13, 2006, the disclosures of which are expressly incorporated by reference herein.

STATEMENT REGARDING FEDERALLY SPONSORED RESEARCH OR DEVELOPMENT

The inventions described herein may be manufactured, used and licensed by or for the U.S. Government.

BACKGROUND OF THE INVENTION

The present invention relates to a method and apparatus for resisting ballistic impact, and more particularly to a ballistic resistant composite structure and its related method of manufacture.

There has been an increased emphasis on compliance with ballistic impact standards in an effort to improve anti-ballistic protection for people and property. Potential applications for anti-ballistic structures include body armor, vehicle protection, building protection, and ordnance transit containers.

SUMMARY OF THE INVENTION

According to an illustrative embodiment of the present invention, a ballistic resistant apparatus includes an outer energy absorbing assembly including a front face, a rear face, and a plurality of layers, each of the layers including a plurality of interconnected fibers. The outer energy absorbing assembly is configured to absorb energy from a projectile traveling from the front face toward the rear face. A barrier includes a front face and a rear face, the front face of the barrier being positioned behind the rear face of the outer energy absorbing assembly, and is configured to further absorb energy from the projectile. A movement restraint includes a front face and a rear face, the front face of the restraint being positioned behind the rear face of the barrier. The restraint is configured to limit movement of the outer energy absorbing assembly in response to impact from the projectile. A dampener is positioned intermediate the barrier and the restraint. The dampener is configured to cooperate with the restraint to dampen energy from the projectile as transferred from the barrier.

According to a further illustrative embodiment, a method of manufacturing a ballistic resistant composite structure includes the steps of providing a first layer of interconnected fibers, coating the first layer with a resin, providing a second layer of interconnected fibers, and coating the second layer with a resin. The method further comprises the steps of pressing together the first layer and the second layer to form an energy absorbing assembly. The method further comprises the steps of providing a barrier having a front face and a rear face, placing the front face of the barrier adjacent the energy absorbing assembly, coating the rear face of the barrier with a resin, providing a backing plate having a front face and a rear face, and pressing the front face of the backing plate against the resin on the rear face of the barrier.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Figure 1:
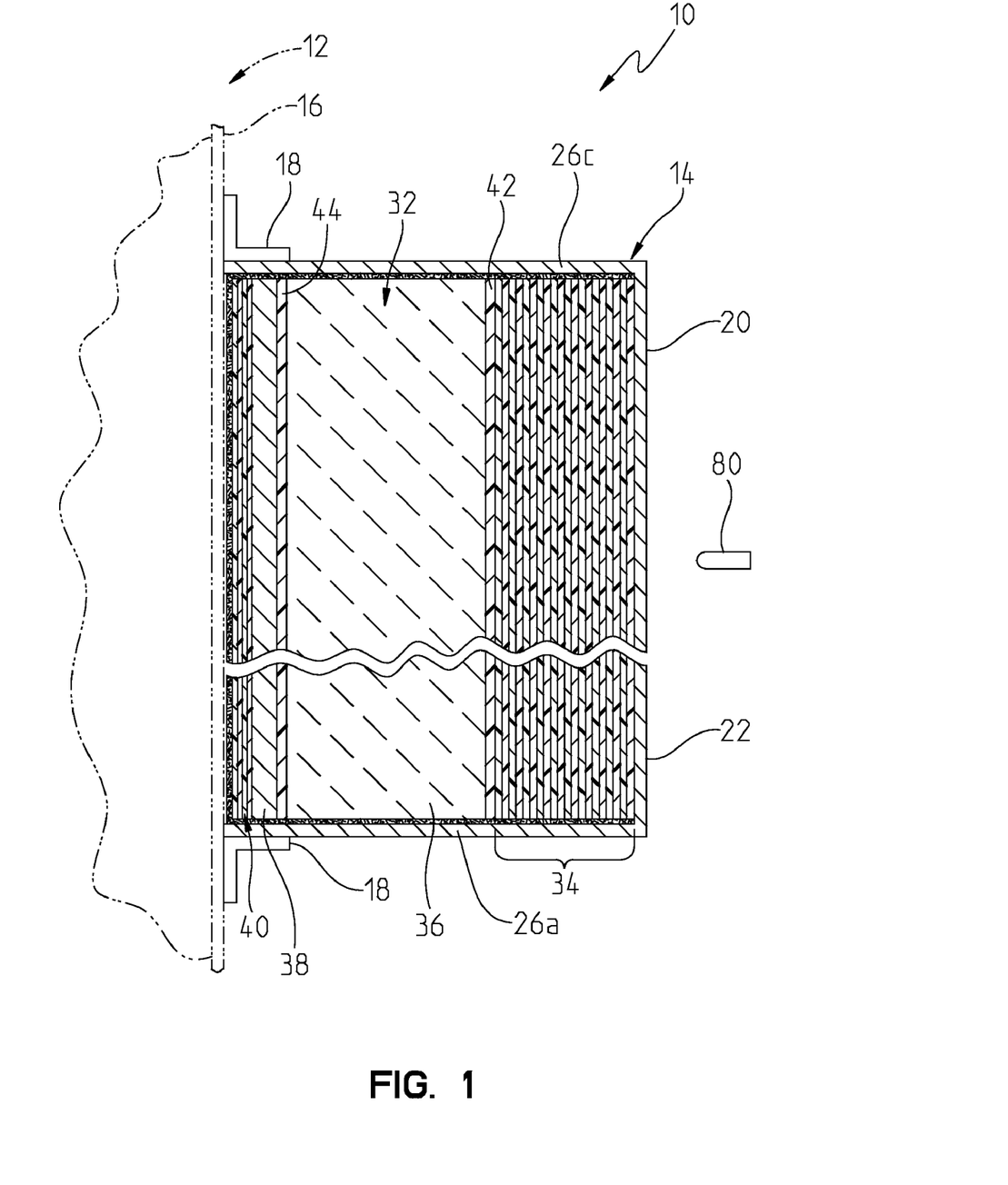
FIG. 1 is a cross-sectional view showing an illustrative ballistic resistant apparatus coupled to a vehicle.

Referring initially to FIG. 1, an illustrative ballistic resistant apparatus 10 is shown coupled to a vehicle 12. In one illustrative embodiment, the ballistic resistant apparatus 10 includes a frame assembly 14 which is coupled to a door 16 of the vehicle 12 through conventional fastening means. While brackets 18 are shown for being bolted to the door 16, it should be appreciated that other fastening means could be used, such as welding or adhesives. In further illustrative embodiments, the frame assembly 14 may be formed as an integral part of the door 16.

While FIG. 1 shows the ballistic resistant apparatus 10 coupled to a vehicle, it should be appreciated that the apparatus 10 may be used in connection with other applications, such as building protection, containers, and body armor. For example, the ballistic resistant apparatus 10 may be utilized in connection with a variety of modes of commercial transportation, such as planes, helicopters, trains, and buses that may need to be secured from a sniper attack. Furthermore, the ballistic resistant apparatus 10 may be utilized to protect sensitive buildings and installations from ballistic threats.

Figure 2:
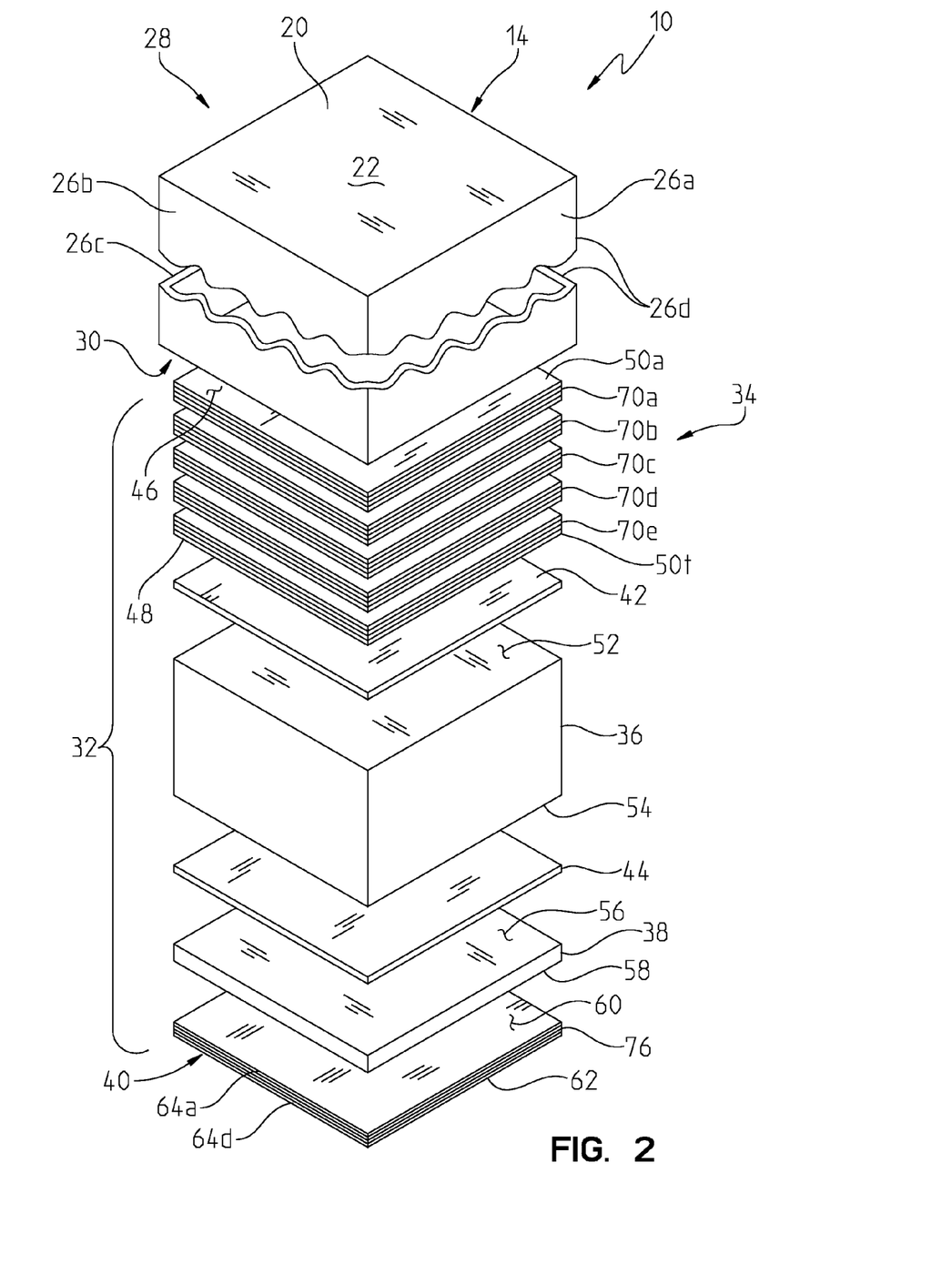
FIG. 2 is an exploded perspective view of an illustrative ballistic resistant apparatus.
Figure 3:
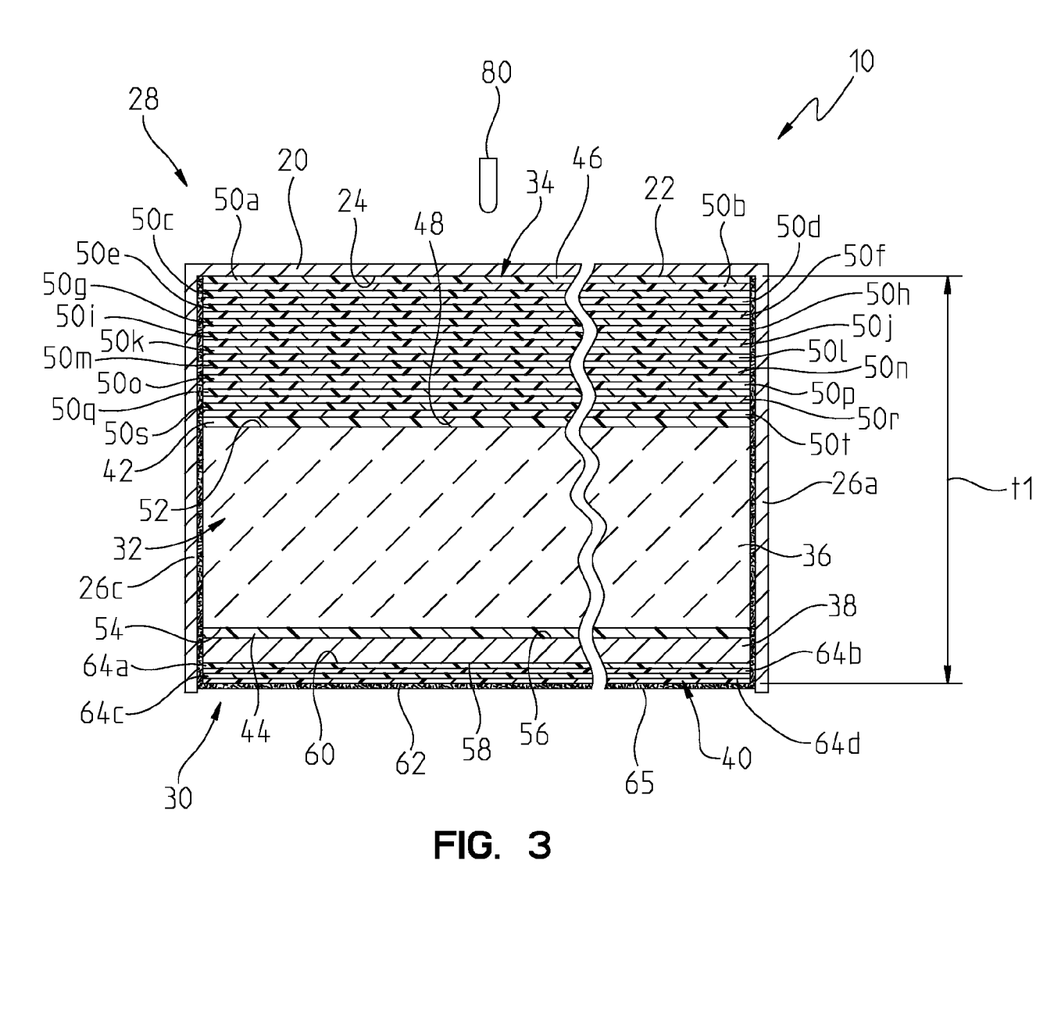
FIG. 3 is a cross-sectional view of the ballistic resistant apparatus of FIG. 2.

With further reference now to FIGS. 2 and 3, the frame assembly 14 includes an outer strike plate 20 having a front face 22 and a rear face 24. Illustratively, the strike plate 20 is formed of an aluminum plate having a square periphery of about 8 inches by 8 inches and a of thickness of about 0.0625 inches. A plurality of side walls 26 extend downwardly from the outer strike plate 20 in perpendicular relationship thereto, such that the frame assembly 14 generally defines a box having a closed end 28 defined by the strike plate 20 and an open end 30 defined by the side walls 26. Each of the side walls 26a, 26b, 26c, and 26d is also illustratively formed of an aluminum plate having a thickness of about 0.0625 inches.

A core or composite structure 32 is received within the open end 30 of the frame assembly 14. The core 32 is configured to prevent penetration of a 0.50 caliber bullet, and illustratively has a thickness (t1) of approximately 2 inches and an areal density of about 22 lbs. per square foot (equating to about 0.076 lbs. per cubic inch).

The core 32 includes an outer energy absorbing assembly 34, a barrier, such as ceramic panel 36, a movement restraint, such as backing plate 38, and an inner energy absorbing assembly 40. An outer dampener, illustratively outer resin layer 42, is illustratively positioned intermediate the outer energy absorbing assembly 34 and the ceramic panel 36, and an inner dampener, illustratively inner resin layer 44, is positioned intermediate the ceramic panel 36 and the backing plate 38. The resin layers 42 and 44 are illustratively a polyurethane such as Conathane EN-1556 available from Conap, Inc.

The outer energy absorbing assembly 34 illustratively includes a front face 46 and a rear face 48. The front face 46 of the outer energy absorbing assembly 34 is positioned behind and adjacent to the rear face 24 of the outer strike plate 20. The outer energy absorbing assembly 34 illustratively includes at least 15 juxtaposed layers 50 formed of interconnected aramid fibers impregnated with a resin. In one illustrative embodiment, the interconnected aramid fibers are Kevlar® available from DuPont, and the impregnated resin is a polyurethane, such as Conathane EN-1556.

In the embodiment shown in FIGS. 2 and 3, outer layer 50a of the outer energy absorbing assembly 34 is positioned adjacent to, and illustratively contacts, the rear face 24 of the outer strike plate 20, while an inner layer 50t of the outer energy absorbing assembly 34 is positioned adjacent the ceramic panel 36. Eighteen additional intermediate layers 50b-50s are positioned intermediate the outer layer 50a and the inner layer 50t of the outer energy absorbing assembly 34. Each of the layers 50 have a thickness of about 0.035 inches, such that the outer energy absorbing assembly 34 has a total thickness of about 0.5 inches.

The ceramic panel 36 includes a front face 52 and a rear face 54, the front face 52 being positioned behind and adjacent to the rear face 48 of the outer energy absorbing assembly 34. The ceramic panel 36 illustratively has a thickness as measured between the front face 52 and the rear face 54 of at least one inch. In one illustrative embodiment, the ceramic panel 36 preferably includes 90% high-density alumina.

The outer resin layer 42 is illustratively formed of a polyurethane, again such as Conathane EN-1556, and adheres the ceramic panel 36 to the outer energy absorbing assembly 34. The outer resin layer 42 illustratively has a thickness of about 0.05 inches. The backing plate 38 is illustratively formed of aluminum having a thickness of at least 0.125 inches. The backing plate 38 includes a front face 56 and rear face 58, the front face 56 is positioned behind and adjacent to the rear face 54 of the ceramic panel 36. The inner resin layer 44, illustratively polyurethane such as Conathane EN-1556, is positioned intermediate the ceramic panel 36 and the backing plate 38, and is configured to adhere the ceramic panel 36 to the backing plate 38.

The inner energy absorbing assembly 40 includes a front face 60 and a rear face 62, the front face 60 being positioned behind and adjacent to the rear face 58 of the backing plate 38. In the embodiment of FIGS. 2 and 3, the inner energy absorbing assembly 40 includes an outer layer 64a, an inner layer 64d, and two intermediate layers 64b and 64c positioned intermediate the outer layer 64a and the inner layer 64d. Each of the layers 64 includes a plurality of interconnected aramid fibers impregnated with a resin. As with the outer energy absorbing assembly 34, the layers 64 of the inner energy absorbing assembly 40 are illustratively formed of Kevlar® impregnated with a polyurethane, such as Conathane EN-1556. As further detailed herein, a potting compound 65, illustratively a resin such as polyurethane Conathane EN-1556, fills the spaces or gaps between the core 32 and the frame assembly 14.

Figure 4:
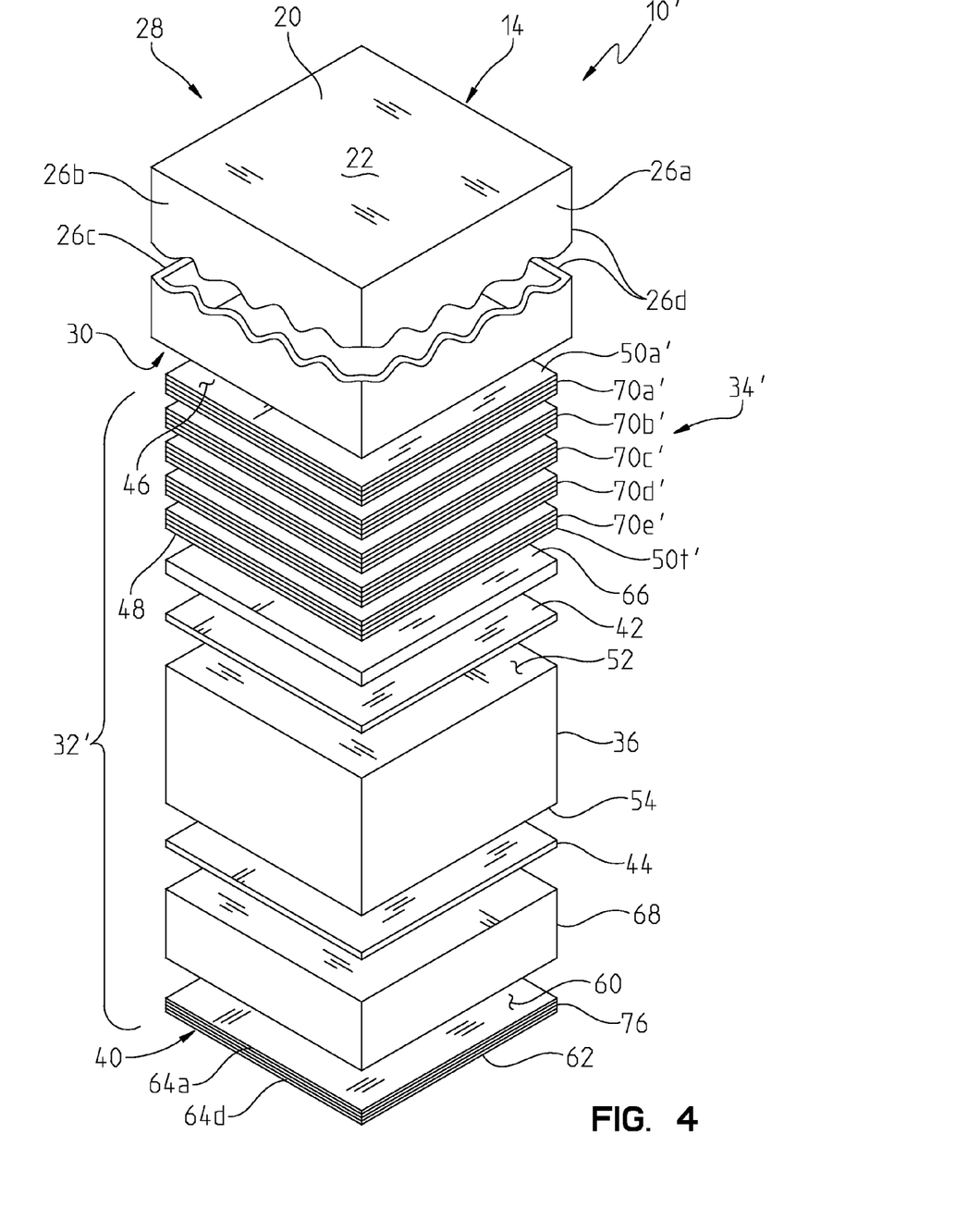
FIG. 4 is an exploded perspective view of a further illustrative ballistic resistant apparatus.
Figure 5:
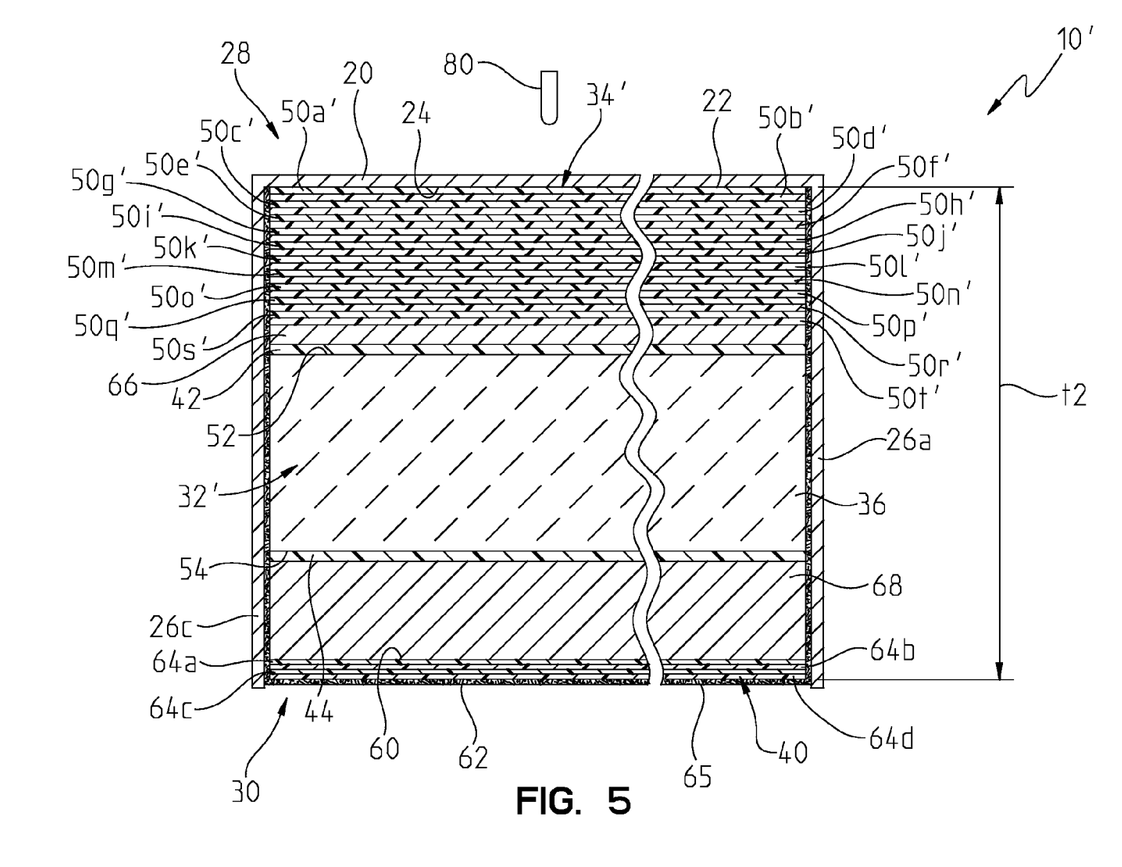
FIG. 5 is a cross-sectional view of the ballistic resistant apparatus of FIG. 4.

FIGS. 4 and 5 illustrate a further illustrative embodiment of the ballistic resistant apparatus 10' including a core 32' received within the frame assembly 14. The core 32' is configured to prevent penetration of a 0.50 caliber bullet, and illustratively has a thickness (t2) of approximately 3 inches and an areal density of about 34.5 lbs. per square foot (equivalent to about 0.08 lbs. per cubic inch). Many of the components of the ballistic resistant apparatus 10' are similar to the ballistic resistant apparatus 10 detailed above. As such, in the following description like reference numbers will be used to identify similar components.

The core 32' includes an outer energy absorbing assembly 34', a first backing plate 66, ceramic panel 36, a second backing plate 68, and inner energy absorbing assembly 40. The outer energy absorbing assembly 34' of FIGS. 4 and 5 is similar to assembly 34 detailed above, but with each layer 50' having a thickness of about 0.025 inches.

First backing plate 66 is illustratively positioned intermediate the ceramic panel 36 and the outer energy absorbing assembly 34' and is formed of 0.1 inch steel. As with the ballistic resistant apparatus 10 of FIGS. 2 and 3, the ballistic resistant apparatus 10' includes outer and inner resin layers 42 and 44 positioned adjacent the ceramic panel 36. The ceramic panel 36 may be identical to that detailed above. In the embodiment of FIGS. 4 and 5, the second backing plate 68 is formed of 0.5 inch steel. The inner energy absorbing assembly 40 is illustratively identical to that detailed above with respect to the embodiment of FIGS. 2 and 3.

Figure 6:
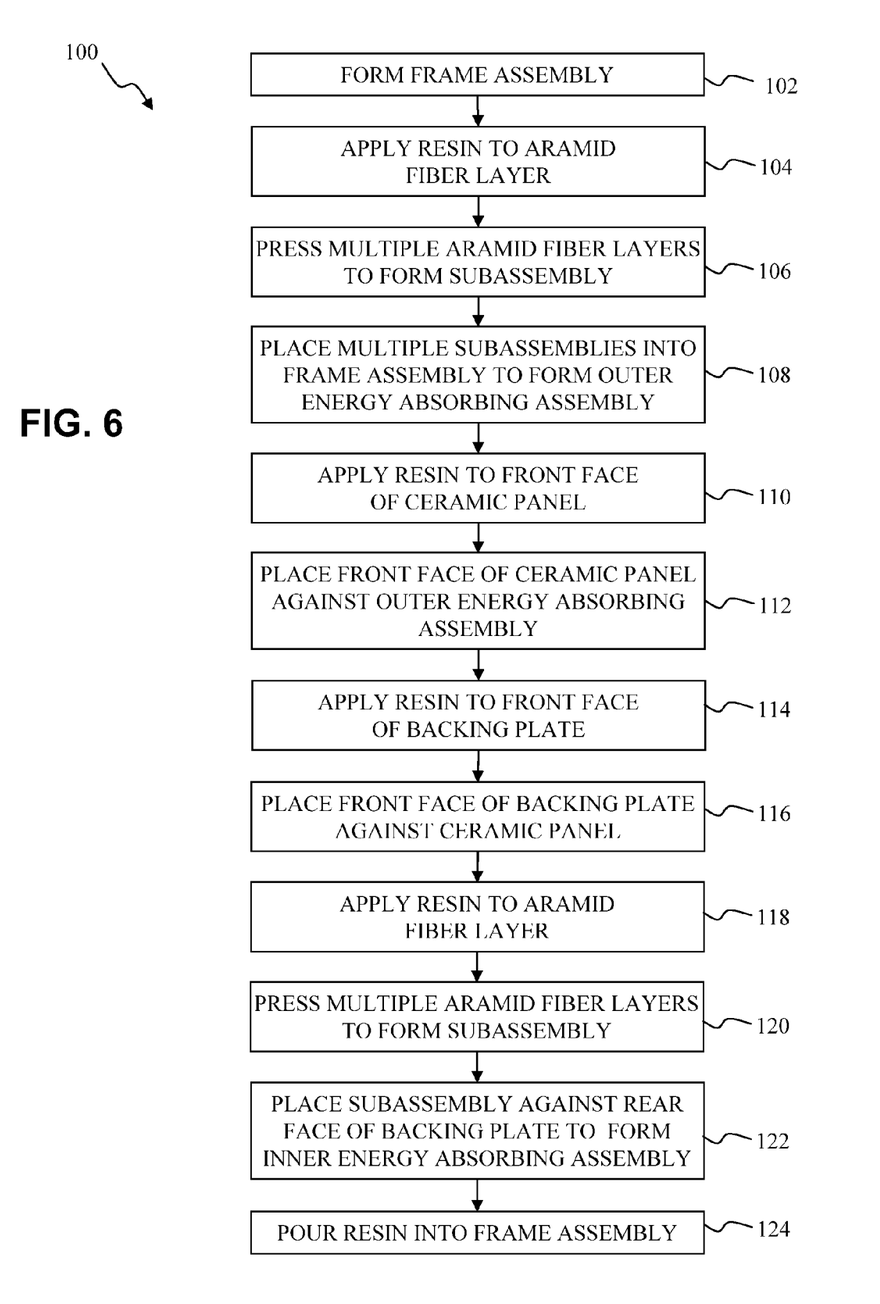
FIG. 6 is a block diagram of an illustrative method of forming the ballistic resistant apparatus of FIG. 2.
Figure 7:
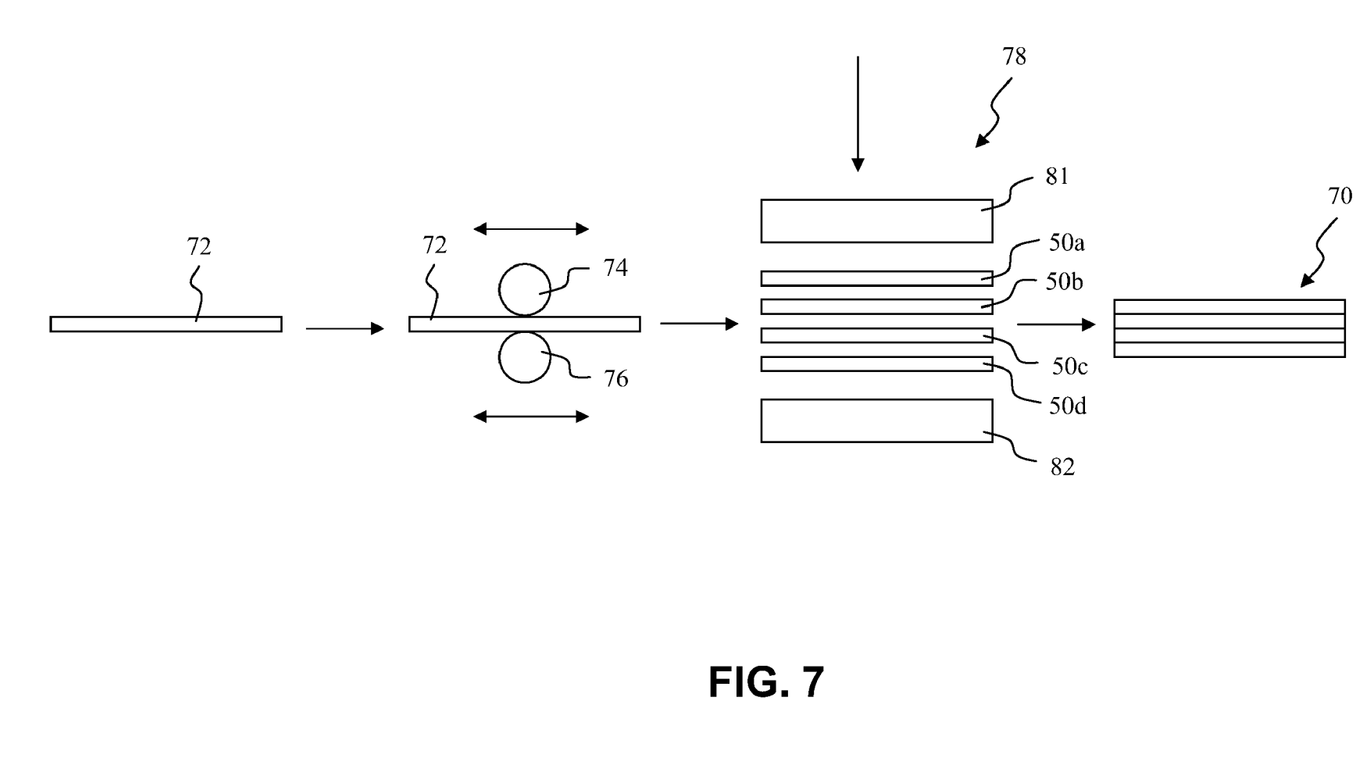
FIG. 7 is a schematic diagram further detailing the illustrative method of FIG. 6.

With reference now to FIGS. 6 and 7, an illustrative method 100 of manufacturing the ballistic resistant apparatus 10 begins with forming the frame assembly 14 at step 102. As noted above, the frame assembly 14 illustratively includes an aluminum outer strike plate 20 and side walls 26. The strike plate 20 and side walls 26 may be formed of conventional aluminum plates which are welded together to form the open box structure illustrated in FIGS. 2 and 3. The core 32 is assembled within the frame assembly 14 by inverting the assembly 14 so that it is supported by the strike plate 20 and the open end 30 is accessible. A plurality of outer energy absorbing subassemblies 70 are then place within the frame assembly 14.

With further reference to FIGS. 7 and 8, each subassembly 70 is formed by initially providing a conventional layer 72 of aramid fibers. At step 104, the aramid fiber layer 72 is then coated with a polyurethane which impregnates the fibers. The polyurethane impregnation improves the burst strength and the effectiveness of the aramid fibers. The coating process may be accomplished manually through the use of conventional application tools, such as brushes, or the aramid fiber layer 72 may be passed through a pair of coating rollers 74 and 76 (FIG. 7). In the illustrative embodiment, four of the polyurethane impregnated aramid fiber layers 50 are then assembled or stacked within a press 78. An upper platen 81 applies force in a direction toward a base 82 thereby pressing the individual layers 50 together and forming subassembly 70 at step 108. In the illustrative embodiment, five sets of the four layer subassemblies 70 are inserted within the frame assembly 14. More particularly, the first subassembly 70a is placed against the interface of the strike plate 20, followed by the second, third, and fourth subassemblies 70b, 70c, and 70d. In a further illustrative embodiment, the five subassemblies 70 may be placed within the press 78 to form the outer energy absorbing assembly 34 prior to placement within the outer frame assembly 14.

At step 110, polyurethane is applied to the front face 52 of the ceramic panel 36. The front face 52 of the ceramic panel 36 is then placed against the outer energy absorbing assembly 34 at step 112. Next, polyurethane is applied to the front face 56 of the backing plate 38 at step 114. At step 116, the front face 56 of the backing plate 38 is then placed against the rear face 54 of the ceramic panel 36. Next, the inner energy absorbing assembly 40 is formed in a manner similar to that detailed above with respect to the outer energy absorbing assembly 34. More particularly, polyurethane is applied to each of the plurality of aramid fiber layers 72 at step 118. The polyurethane impregnated layers 64 are then pressed together, illustratively with the press 78, to form a subassembly 76 at step 120. In the illustrative embodiment, a single subassembly 70 defines the inner energy absorbing assembly 40.

At step 122, the inner energy absorbing assembly 40 is placed within the frame assembly 14 against the rear face 58 of the backing plate 38. Potting compound 65, illustratively polyurethane, is then poured over the rear face of the inner energy absorbing assembly 40 at step 124. The polyurethane 65 fills in voids and/or gaps within the outer frame assembly 14 between the core 32 and the outer strike plate 20 and side walls 26. As such, the polyurethane secures or fixes the core 32 within the outer frame assembly 14.

With reference now to FIGS. 2 and 4, the ballistic resistant apparatus 10, 10' is configured to resist 0.50 caliber bullet penetration. More particularly, the ballistic resistant apparatus 10, 10' is configured to defeat an attack threat from a 0.50 caliber M2 armor-piercing bullet 80, typically traveling around 2800 feet per second. The outer energy absorbing assembly 34 absorbs initial projectile impact energy thereby reducing velocity and enhancing the effectiveness of the ceramic panel 36. In other words, the outer energy absorbing assembly 34 is configured to absorb energy from the projectile 80 as it travels from front face 46 to rear face 48. As such, the thickness of the ceramic panel 36 may be reduced without sacrificing protection. In the illustrative embodiment, the ceramic panel 36 is configured to further absorb energy from the projectile 80, and illustratively fracture upon sufficient impact. As noted above, the urethane impregnated polyimide layers 50 reduces or improves the fiber strength thereby reducing burst penetration of the bullet 80. The resin layer 44 between the rear face of the ceramic panel 36 and the backing plate 38 acts as an energy dampener or shock absorber, the resin layer 44 cooperates with the backing plate 38 restrains or limits movement of the ceramic panel 36 in response to impact from projectile 80. The inner energy absorbing assembly 40 further anticipates energy transfer and absorbs energy transferred by the ceramic panel 36.

The illustrative ballistic resistant apparatus 10 of FIGS. 2 and 3 has been shown effective in stopping penetration of a 0.50 caliber armor-piercing bullet 80 traveling up to around 2900 feet per second. The further illustrative embodiment ballistic resistant apparatus 10' of FIGS. 4 and 5 has been shown to be effective in withstanding multiple 0.50 caliber bullet penetrations. More particularly, the ballistic resistant apparatus 10 has prevented penetration of three independent 0.05 caliber bullet impacts within an approximate 8 inch by 8 inch surface area. Furthermore, the ballistic resistant apparatus 10' has been shown to prevent penetration of light armored penetrator (SLAP) rounds traveling typically between 3800-4000 feet per second.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A ballistic resistant apparatus comprising:
 an outer energy absorbing assembly including a front face, a rear face and a plurality of layers, each of the layers including a plurality of interconnected fibers, the outer energy absorbing assembly being configured to absorb energy from a projectile traveling from said front face toward said rear face;
 a barrier including a front face and a rear face, the front face of the barrier being positioned behind the rear face of the outer energy absorbing assembly and configured to further absorb energy from the projectile;
 a movement restraint including a front face and a rear face, the front face of the restraint being positioned behind the rear face of the barrier and configured to limit movement thereof in response to impact from the projectile; and
 a dampener positioned intermediate the barrier and the restraint, the dampener configured to cooperate with the restraint to dampen energy from the projectile as transferred from the barrier.

2. The apparatus of claim 1, further comprising an inner energy absorbing assembly including a front face and a rear face, the front face of the inner energy absorbing assembly positioned behind the rear face of the restraint, the inner energy absorbing assembly including a plurality of layers, each of the layers including a plurality of interconnected fibers, the inner energy absorbing assembly being configured to absorb energy from the projectile as transferred through the barrier.

3. The apparatus of claim 2, wherein each of the layers of the inner energy absorbing assembly includes a plurality of interconnected aramid fibers impregnated with a resin.

4. The apparatus of claim 1, further comprising an outer strike plate including a front face and a rear face, the outer energy absorbing assembly being positioned behind the rear face of the outer strike plate.

5. The apparatus of claim 4, further comprising a plurality of sidewalls extending inwardly from the outer strike plate around the periphery of the outer energy absorbing assembly, the barrier, the restraint, and the dampener.

6. The apparatus of claim 5, further comprising a potting compound securing the outer energy absorbing assembly, the barrier, the restraint, and the dampener within the plurality of sidewalls.

7. The apparatus of claim 1, wherein the restraint is formed of metal.

8. The apparatus of claim 1, wherein each of the layers of the outer energy absorbing assembly includes a plurality of interconnected aramid fibers impregnated with a resin.

9. The apparatus of claim 1, wherein the barrier comprises a ceramic panel configured to fracture when absorbing sufficient energy.

10. The apparatus of claim 1, wherein the restraint comprises a backing plate.

11. The apparatus of claim 1, wherein the dampener comprises a resin layer.

12. A ballistic resistant apparatus comprising:
a composite structure including a front side and a rear side positioned in spaced relation to the front side;
the composite structure further including:
a substantially planar outer energy absorbing assembly positioned proximate the front side and including an outer layer and an inner layer, each of the outer layer and the inner layer including a plurality of interconnected aramid fibers impregnated with a resin;
a substantially planar backing plate positioned proximate the rear side, the backing plate formed of metal; and
a substantially planar ceramic panel positioned intermediate the inner layer of the substantially planar outer energy absorbing assembly and the backing plate.

13. The apparatus of claim 12, wherein the distance from the front side to the rear side is less than about 3 inches.

14. The apparatus of claim 12, further including an areal density of less than about 22 pounds per square foot.

15. The apparatus of claim 12, wherein the composite structure further includes an inner energy absorbing assembly including a front face and a rear face, the front face of the inner energy absorbing assembly positioned adjacent the backing plate, the inner energy absorbing assembly including a plurality of layers, each of the layers including a plurality of interconnected aramid fibers impregnated with a resin.

16. The apparatus of claim 12, further comprising an outer strike plate positioned adjacent to the front side of the composite structure.

17. The apparatus of claim 16, further comprising a plurality of sidewalls extending inwardly from the outer strike plate around the periphery of the outer energy absorbing assembly, the ceramic panel, and the backing plate.

18. The apparatus of claim 17, further comprising a potting compound securing the outer energy absorbing assembly, the ceramic panel, and the backing plate within the plurality of sidewalls.

19. The apparatus of claim 12, further comprising a resin layer positioned intermediate the ceramic panel and the backing plate, the resin layer configure to dampen energy transferred by the ceramic panel.

20. A ballistic resistant composite structure comprising:
an outer energy absorbing assembly including an outer layer, an inner layer, and at least thirteen intermediate layers positioned intermediate the outer layer and the inner layer, each of the layers including a plurality of interconnected aramid fibers impregnated with a resin and having a thickness of at least 0.025 inches;
a ceramic panel including a front face and a rear face, the front face of the ceramic panel being positioned behind the inner layer of the outer energy absorbing assembly, the ceramic panel having a thickness between the front face and the rear face of at least one inch;
a backing plate including a front face and a rear face, the front face of the backing plate being positioned behind the rear face of the ceramic panel, the backing plate formed of metal and having a thickness between the front face and the rear face of at least 0.125 inches; and
a resin layer positioned intermediate the ceramic panel and the backing plate.

21. The structure of claim 20, further comprising an inner energy absorbing assembly including a front face and a rear face, the front face of the inner energy absorbing assembly positioned behind the rear face of the backing plate, the inner energy absorbing assembly including an inner layer, an outer layer, and at least two layers intermediate layers positioned intermediate the inner layer and the outer layer, each of the layers including a plurality of interconnected aramid fibers impregnated with a resin and having a thickness of at least 0.025 inches.

22. The structure of claim 21, wherein the distance from a front side of the outer layer of the outer energy absorbing assembly to a rear side of the inner layer of the inner energy absorbing assembly is less than about 3 inches.

23. The structure of claim 22, further including an areal density of less than about 22 pounds per square foot.

24. The structure of claim 20, further comprising an outer strike plate positioned adjacent to the outer layer of the outer energy absorbing assembly, the outer strike plate formed of metal and having a thickness of at least 0.0625 inches.

25. A method of manufacturing a ballistic resistant composite structure, the method comprising the steps of:
providing a first layer of interconnected fibers;
coating the first layer with a resin;
providing a second layer of interconnected fibers;
coating the second layer with a resin;
pressing together the first layer, and the second layer to form an energy absorbing assembly;
providing a barrier having a front face and a rear face;
placing the front face of the barrier adjacent the energy absorbing assembly;
coating the rear face of the barrier with a resin;
providing a backing plate having a front face and a rear face; and
pressing the front face of the backing plate against the resin on the rear face of the barrier.

26. The method of claim 25, further comprising the steps of:
coating the front face of the barrier with a resin; and
pressing the resin coated front face of the barrier against the energy absorbing assembly.

27. The method of claim 25, further comprising the steps of:
providing a frame assembly including an outer strike plate and a plurality of sidewalls;
inserting the energy absorbing assembly, the barrier, and the backing plate into the frame assembly; and
potting with a resin the energy absorbing assembly, the barrier, and the backing plate within the frame assembly.

28. The method of claim 27, further comprising the step of coupling the frame assembly to a vehicle.

29. The method of claim 25, wherein the barrier comprises a ceramic panel.

* * * * *